US007949672B2

(12) United States Patent
Zhang et al.

(10) Patent No.: US 7,949,672 B2
(45) Date of Patent: May 24, 2011

(54) IDENTIFYING REGIONAL SENSITIVE QUERIES IN WEB SEARCH

(75) Inventors: Ya Zhang, Sunnyvale, CA (US); Srinivas Vadrevu, Santa Clara, CA (US); Belle Tseng, Cupertino, CA (US); Gordon Guo-Zheng Sun, Redwood City, CA (US); Xin Li, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 400 days.

(21) Appl. No.: 12/136,279

(22) Filed: Jun. 10, 2008

(65) Prior Publication Data

US 2009/0307198 A1    Dec. 10, 2009

(51) Int. Cl.
 *G06F 7/00* (2006.01)
 *G06F 17/30* (2006.01)
(52) U.S. Cl. ........................................ 707/767; 707/769
(58) Field of Classification Search .................... 705/14; 709/223
 See application file for complete search history.

(56) References Cited

U.S. PATENT DOCUMENTS

| | | | | |
|---|---|---|---|---|
| 6,003,207 | A | * | 12/1999 | Homma ........................ 24/3.12 |
| 6,757,670 | B1 | | 6/2004 | Inohara et al. |
| 7,636,715 | B2 | * | 12/2009 | Kalleh ................................ 1/1 |
| 2005/0240580 | A1 | * | 10/2005 | Zamir et al. ........................ 707/4 |
| 2006/0282328 | A1 | * | 12/2006 | Gerace et al. .................... 705/14 |
| 2008/0082417 | A1 | * | 4/2008 | Publicover ...................... 705/14 |
| 2008/0104026 | A1 | * | 5/2008 | Koran ................................ 707/3 |

OTHER PUBLICATIONS

Dou Shen et al. "Building Bridges for Web Query Classification", SIGIR '06; Department of Computer Science and Engineering, Hong Kong University of Science and Technology, and Microsoft Research Asia, Beijing, P.R.China; pp. 131-138; Aug. 6-11, 2006.
Honghua (Kathy) Dai et al. "Detecting Online Commercial Intention (OCI)", WWW 2006, International World Wide Conference Committee (IW3C2); 9 pgs; May 23-26, 2006.
Bernard J. Jansen et al. "Determining the User Intent of Web Search Engine Queries", WWW 2007, College of Information Sciences and Technology, The Pennsylvania State University; pp. 1149-1150; May 8-12, 2007.

* cited by examiner

*Primary Examiner* — Susan Y Chen
(74) *Attorney, Agent, or Firm* — Brinks Hofer Gilson & Lione

(57) ABSTRACT

A system for determining the intent of query that includes a search engine that receives a first search query, a query/click log module configured to store log data associated with the first search query; and a computational module that generates metric values associated with the first search query based on the log data and that determines that the first search query is one of a regional specific query or a global query based on the metric values, where the metric values reflect a likelihood of local intent of the first search query, and where the search engine provides search results selected in part based on the metric values.

20 Claims, 5 Drawing Sheets

IDENTIFYING REGIONAL SENSITIVE QUERIES IN WEB SEARCH

BACKGROUND

1. Technical Field

The present disclosure relates generally to data processing systems and methods and, more particularly, to identifying regionally sensitive queries.

2. Related Art

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Users of network-connected computers and mobile devices such as personal digital assistants and (users) may request information by formulating a search query and submitting the search query, for example, to an internet search engine. Internet search engines are often used to search (i.e. query) the internet for specific content that is of interest to the user. Queries are generally accomplished by entering keywords into a search field that relate to the specific interest of the user.

With the growth of the internet and the World Wide Web, the number of computer users performing searches from various geographic locations has increased. As such, the expected results from these queries may vary greatly based upon the geographic location of the user issuing the query. Queries in which the expected results of a user are based on the user's location are known as "regional sensitive queries". In other words, users typically desire results associated with a specific geographic location (local results) when issuing regional sensitive queries. Users issuing regional sensitive queries are considered to have local intent. On the other hand, queries that bear no specific local intent are known as "global queries".

A user with a local intent is primarily interested in search results that satisfy that intent. Search results that are not limited to the region of interest can be distracting or annoying to the searcher. The searcher may not be able to find the specific information required. The search provider who operates the internet search engine may lose a business opportunity with the searcher because the search results are insufficiently tailored to the searcher's local intent. Unfortunately, local intent is not always explicitly indicated in a search query. As such, there exists a need for an enhanced system and method for distinguishing regional sensitive queries from global queries in order to more readily identify the local intent of a user.

BRIEF SUMMARY

The present invention is defined by the following claims, and nothing in this section should be taken as a limitation on those claims. By way of introduction, the preferred embodiments below provide a system for determining the intent of a query that includes a search engine that receives a first search query, a query/click log module configured to store log data associated with the first search query; and a computational module that generates metric values associated with the first search query based on the log data and that determines that the first search query is one of a regional specific query or a global query based on the metric values, where the metric values reflect a likelihood of local intent of the first search query, and where the search engine provides search results selected in part based on the metric values.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The preferred embodiments will now be described with reference to the attached drawings.

DETAILED DESCRIPTION AND THE PRESENTLY PREFERRED EMBODIMENTS

Figure 1:
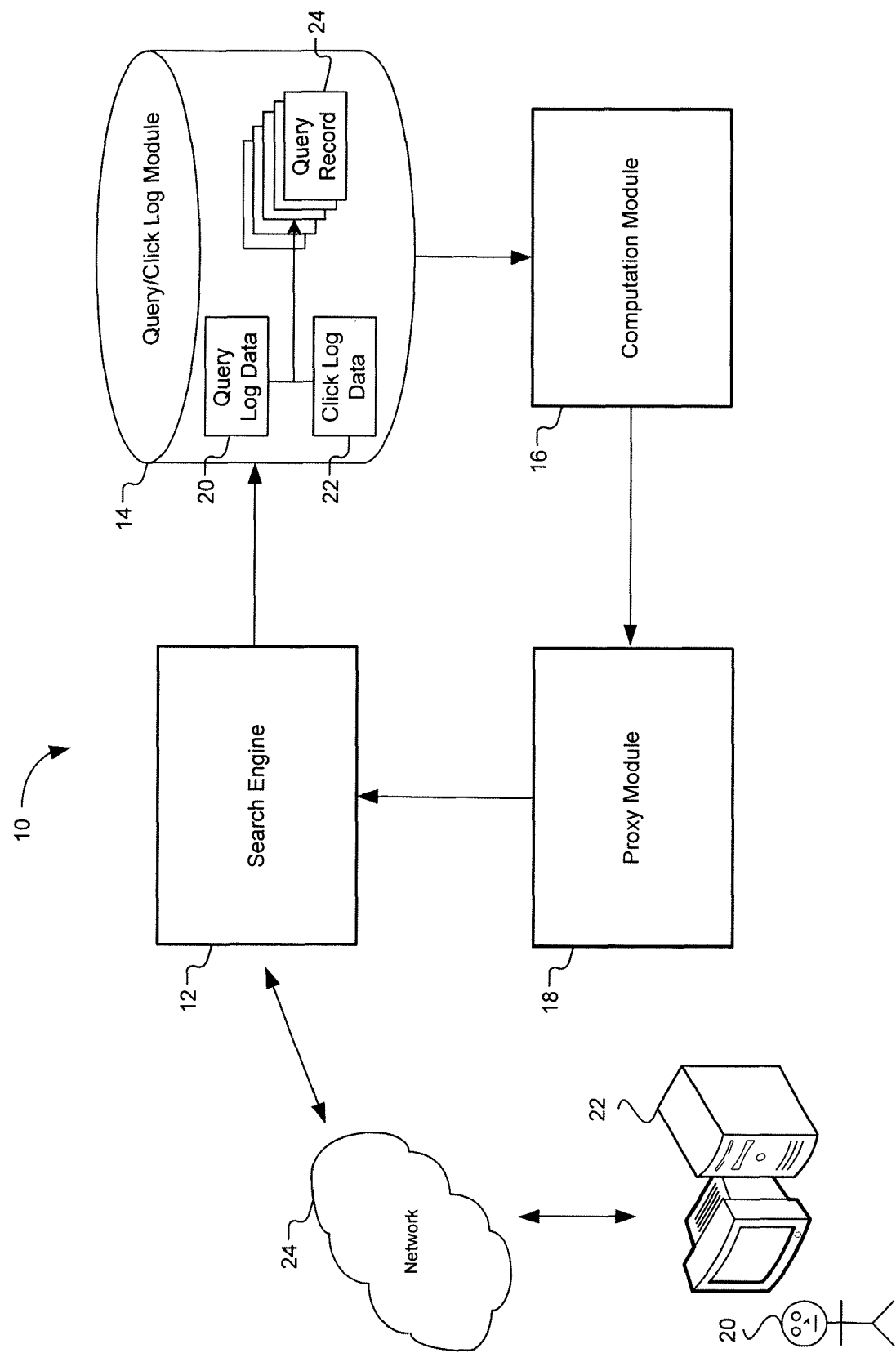
FIG. 1 is a functional block diagram illustrating an exemplary system including a query classification system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

By way of introduction, the embodiments described herein are related to various systems and methods that classify search queries based on web search logs and are merely exemplary in nature. More particularly, a system is configured to identify local intent (i.e., user's desire to receive geographically specific results such as "regional sensitive queries") of a search query submitted to a search engine based on data derived from a compilation of query logs containing information about a number of search queries submitted to at least one search engine by a number of users. The present disclosure describes a query classification system that improves the classification and identification of regional sensitive queries, thereby more effectively recognizing user interest in regional sensitive queries.

As used herein, a search engine refers to a computer program that is configured to search the contents of sources such as a database to locate information related to a search query. A search query refers to a term, phrase, or group of terms, possibly combined with other syntax, symbols, and numbers, etc. that characterizes information that a user seeks from the search engine. A regional sensitive query refers to a search query in which the expected result is based on the geographical location, or geographic region, of interest to a user. In other words, the user typically desires results associated with a specific geographic location (local results) when issuing regional sensitive queries. Queries known as global queries, however, typically bear no local intent.

For example, when a user submits either of the queries "funny pictures" or "garden design" to a search engine, the user intent behind the query is likely not confined to results from a specific region (i.e., the user intent does not bear regional intention). However the query "train tickets" tends to reflect a desire for regional content. As will be described below, a system will be presented that processes query log data and click log data (i.e., user selection data), associated with a search query (e.g., "train tickets") to identify and classify the search query as being a regional sensitive query. The system displays regionally sensitive results, or regional results, at a higher "rank" among all the search results from a given query when the query has been classified as being a regional sensitive query.

The present disclosure contemplates the query classification system having several levels of granularity of regional sensitivity. The various levels may include, but are not limited to, country, state, province, and/or territory. For the sake of simplicity and brevity, the present disclosure will discuss the operation of the query classification system at a country-level designation of regional sensitivity though those skilled in the art will appreciate that the other levels of granularity may be implemented.

Referring now to FIG. 1, an exemplary system 10 that implements the query classification system is shown. The system 10 includes a search engine 12, a query/click log module 14, a computation module 16, a proxy module 18, a user 20, a user device 22, and a network 24. It will be appreciated that one or more of the modules may be integrated together or further sub-divided into additional discrete components. It will also be appreciated that the embodiments disclosed herein may be implemented in one or more computer programs executing on one or more programmable systems comprising at least one module and at least on data storage system. Each such program may be implemented in any desired computer language to communicate with a computer system. Furthermore, variations in the arrangement and type of modules may be made without departing from the spirit or scope of the claims as set for herein. Additionally, different and/or fewer modules may be provided.

The network 24 enables the various components of the system 10 to communicate and pass data to and from one another. The network 24 may include any communication method by which information may travel between the various components of the system 10. The network 24 may include one or more of a wireless network, a wired network, a local area network (LAN), a wide area network (WAN), a direct connection such as through a Universal Serial Bus (USB) port, and may include the set of interconnected networks that make up the Internet, intranet, or other communication network. The network 24 may be the network discussed below with respect to FIG. 5.

The user 20, also referred to as simply the user, utilizes the search engine 12 via the network 24. The user device 22 may be any device that the user utilizes to connect with the network 24. In one embodiment, the network 24 is the Internet and the user device 22 connects with a website provided by a web server, such as the search engine 12, that communicates with the network 24. In alternate embodiments, there may be multiple user devices 22 representing the users that are connected with the network 24. A user may not only include an individual, but a business entity or group of people. Any user may utilize the user device 22, which may include a conventional personal computer, computing device, or a mobile user device, including a network-enabled mobile phone, VoIP phone, cellular phone, personal digital assistant (PDA), pager, network-enabled television, digital video recorder, an/or an automobile. A user device 22 configured to connect with the network 24, may be the general computer system or any of the components as described with respect to FIG. 5. In one embodiment, the user device 22 may be configured to communicate with the search engine 24 through the network 22 with a web browser. The web browser provides an interface through which the user may receive search results in response to a search query submitted via the user device 22. In alternate embodiments, there may be additional user devices 22, and additionally intermediately networks (not shown) that are established to connect the users or user devices.

In one embodiment, the query/click log module 14 stores one or more query logs. The query/click log module 14 may include one or more databases and/or servers (not shown) that store query log data 20 and click log data 22 derived from submitted queries. The query log data 20 and click log data are text or other types of files which store one or more query records 24. A query record 24 may be created and/or maintained by a user (e.g., as a function of their web browser, and/or a search engine) and may represent the submission of a single query, or set of queries, from a user to a search engine (e.g. search engine 12) at a specified time, over a range of time, or over a non-consecutive series of time intervals. Each query record 24 contains data relating to the submitted search query. The data may include the query terms exactly as submitted, a user identifier, and a timestamp of when the user submitted the query and search results that the user has selected (i.e., clicked on).

In one embodiment, the data recorded by the query/click log module 14 includes each search query submission (e.g. a term or group of terms) to the search engine 12. The query/click log module 14 also stores (i.e., logs or records) the list of search results associated with each search query submission. In one embodiment, the query/click log module 14 logs each returned webpage address ("URL") generated upon submission of the query as well as the respective position of each URL within the list of search results. In other words, the query/clock log module 14 logs the relative "ranking" of each returned URL among the list of text search results. The list of search results generated in response to the query submission may be communicated to the user via a web page based display, menu, pop-up window, etc.

Additionally, the query/click log module 14 records the user "click" behavior (i.e., user selection behavior) among the returned URLs for each search query submitted along with information on respective user search preferences. User search preferences may include, but are not limited to, search preferences such as whether a user prefers generic (i.e. global) or local search results based on the user's choices among various field drop down selections, option selections, buttons, links, and other similar interface controls of a user display. The analysis of the query log data 20 and click log data 22 stored by the query/click log module 14 will be discussed in further detail below.

The computational module 16 communicates with the query/click log module 14 and the proxy module 18. The computational module 16 mines a plurality of user sessions derived from the query/click log module 14. Herein, mining may refer to analyzing or otherwise processing the query log data 20 and the click log data 22 for the purpose of computing various regional sensitivity features that assist in identifying regional sensitive queries. In one embodiment, the computational module 16 mines historical search data logged from a plurality of user sessions over a predetermined period of time (e.g., three months, six months, a year, etc.) to provide insight regarding the local intent of various search queries. The computation module 16 generates a metric of each of regional sensitivity features (features) "offline" and then applies the regional sensitivity metrics to subsequent search queries performed by various users of the system 10.

The proxy module 18 communicates with the computational module 16 and the stores the regional sensitivity metrics (metrics) computed for each given search query submitted to the search engine 12. As noted above, the list of search results associated with each search query submission is also logged by the query/click log module 14. As such, the proxy module 18 additionally stores a regional classifier, or regional identification (ID), tagged to each search result (i.e., each URL) generated by a given search query. The regional IDs tagged to each respective search result indicate whether the respective result includes regional content. The utilization of regional IDs will be described in further detail below. Additionally, the proxy module 18 may include one or more databases and/or servers (not shown) that store the metrics and regional IDs derived from submitted queries.

The search engine 12 may be a content provider or a web server operated over a network that provides pages to users, via the user device 22. User devices may be represented by user-interactive devices that typically run browser applications, and the like, to display requested pages (i.e., requested URLs) received over a network as described above. The search engine 12 may comprise a general computing system or any of the components as described with respect to FIG. 5. In various embodiments, the search engine 12 is a webserver that provides a website that may be accessed by users and includes the ability to conduct a search over a network, such as the Internet. The search system offered by Yahoo! Inc. is one example of a search engine embedded in a website (www.yahoo.com). The search engine 12 may receive a search query from a user (e.g., user 20) and provide search results to that user. The search engine 12 may also provide other content and/or advertisements in addition to the search results.

In one embodiment, the search engine 12 may comprise a registration database (not shown) utilized to store registration data provided by various users enabling the users to activate and log into a user account via a user device. The registration data may include information such as each respective user's login name, password, and/or address. The registration database may also include personal information about each respective user.

The search engine 12 employs a ranking function that places the list of search results generated by a search query submission in order based in part on the determined relevancy of the search results. For example, the most relevant search results may be positioned, or displayed, near the top of the search results web page for quick accessibility by a user. In one embodiment, the search engine 12 accesses the metrics generated by the computational module 16 at "run time" (i.e., during execution) related to the same search query via the proxy module 18.

Figure 2:
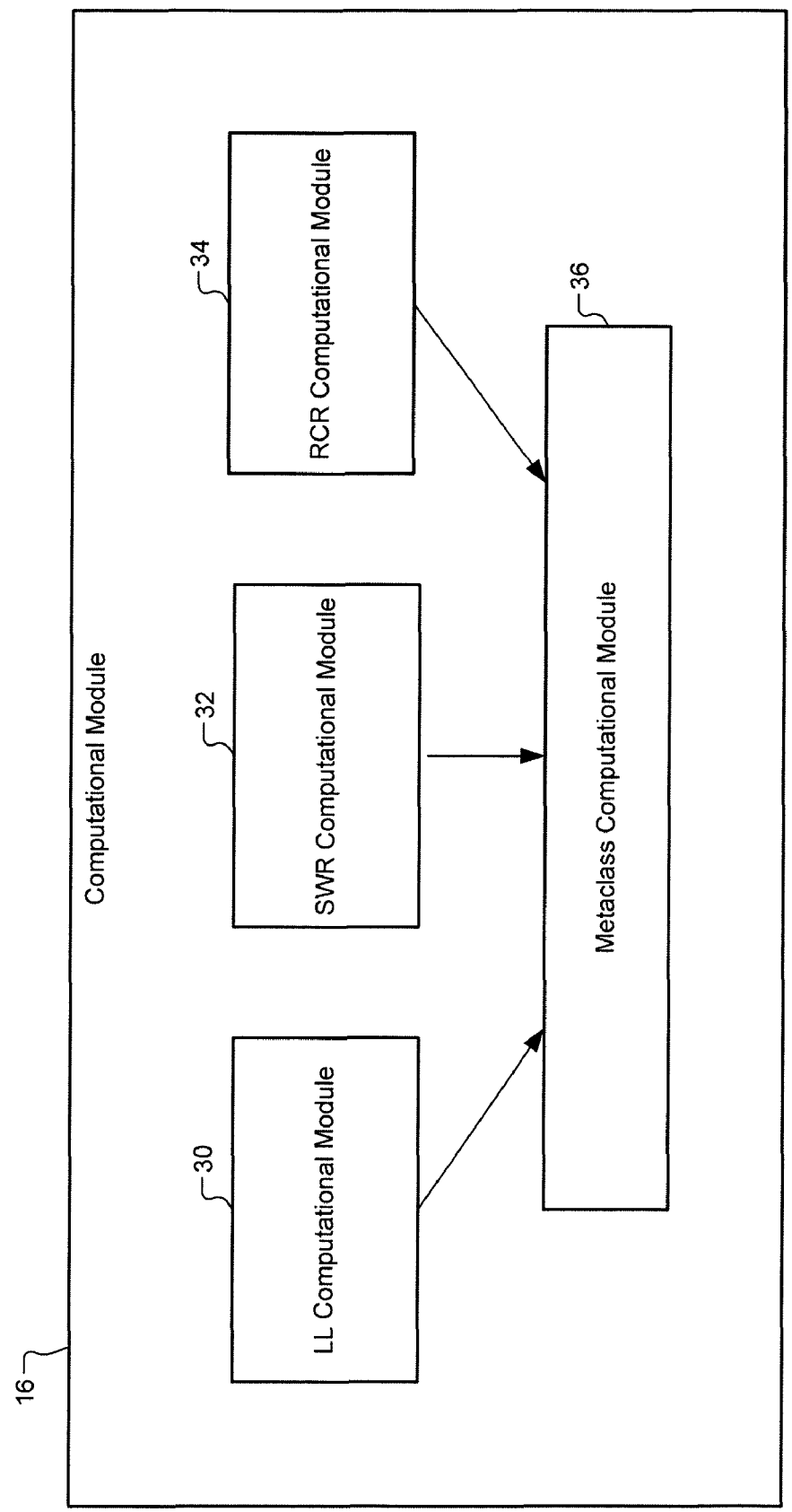
FIG. 2 is a functional block diagram of an exemplary computational module according to the present disclosure.

Referring now to FIG. 2, the computational module 16 that implements the query classification system is shown in more detail. The computational module 16 may include a location likelihood (LL) computation module 30, a local switch rate (SWR) computation module 32, a regional click rate (RCR) module 34, and a meta-query classifier (metaclass) computation module 36. Other computational modules may be used instead of those illustrated in FIG. 2, or other combinations may be used to achieve particular design goals. The computational module 16 communicates with the query/click log module 14 and the proxy module 18.

The LL computation module 30 generates a metric of the location likelihood (LL) feature based on an analysis of co-occurrence statistics of a root term with a location term (i.e., a specific geographic location) within a search query. The root term may be the content or subject of the search, while the location term identifies a location for that content or subject. A search query may simply include a root term that is the subject of the search, or it may also include a location term that identifies a relevant location for the displayed results that are related to the root term of the search query. In other words, the LL computation module 30 determines that a search query is likely a regional sensitive query if a root term (e.g., train tickets) submitted in a search query is frequently coupled with a location term (e.g., New York).

In one embodiment, the LL computation module 30 computes the LL metric of a search query Q as follows:

$$LL(Q) = \sum_{\forall ngrams, N_i} len(N_i) * ll(N_i)$$

where, $$ll(N) = \frac{\text{\# of times } N_i \text{ occurs with any location term } \in D \text{ in } L}{\text{total \# of times } N_i \text{ occurs in } L}$$

where D represents an index of all location terms within a given region, L represents a subset of data from the query/click log module 14 that includes each search query that various users within the given region submitted to the search engine 12, $N_i$ represents a specific n-gram within the search query Q. The search query Q may include a plurality of n-grams. Each n-gram represents a given, contiguous sequence of terms within search query Q. For example, the search query "train tickets" includes the n-grams: "train", "tickets", and "train tickets". It should be noted that the location likelihood $ll(N_i)$ metric associated with each respective n-gram of the search query Q is weighted based on the length of terms constituting the particular n-gram, such that lengthier n-grams receive a greater weight. In one embodiment, the length of an n-gram is defined as the number of terms within the n-gram. In the previous example, the lengths of the n-grams: "train", "tickets", and "train tickets" of the search query "train tickets" equal the values 1, 1, and 2, respectively.

A computed LL metric value that is above an LL threshold value indicates that the corresponding search query likely represents a regional sensitive query. In various embodiments, the LL threshold value may be set at variable values based in part of the amount of historical log data (e.g., the data stored within the query/click log module 14 related to the submitted search query) to be mined by the LL computation module 30. Additionally, the LLR threshold value may be normalized. Those skilled in the art will appreciate that the higher the LL metric value for a particular search query, the stronger the inference that the search query represents a regional sensitive query.

In various embodiments, the LL computation module 30 may include or be coupled with a database such as a geographic database (not shown) that stores various indexes of all location terms within various geographical regions.

Figure 3:
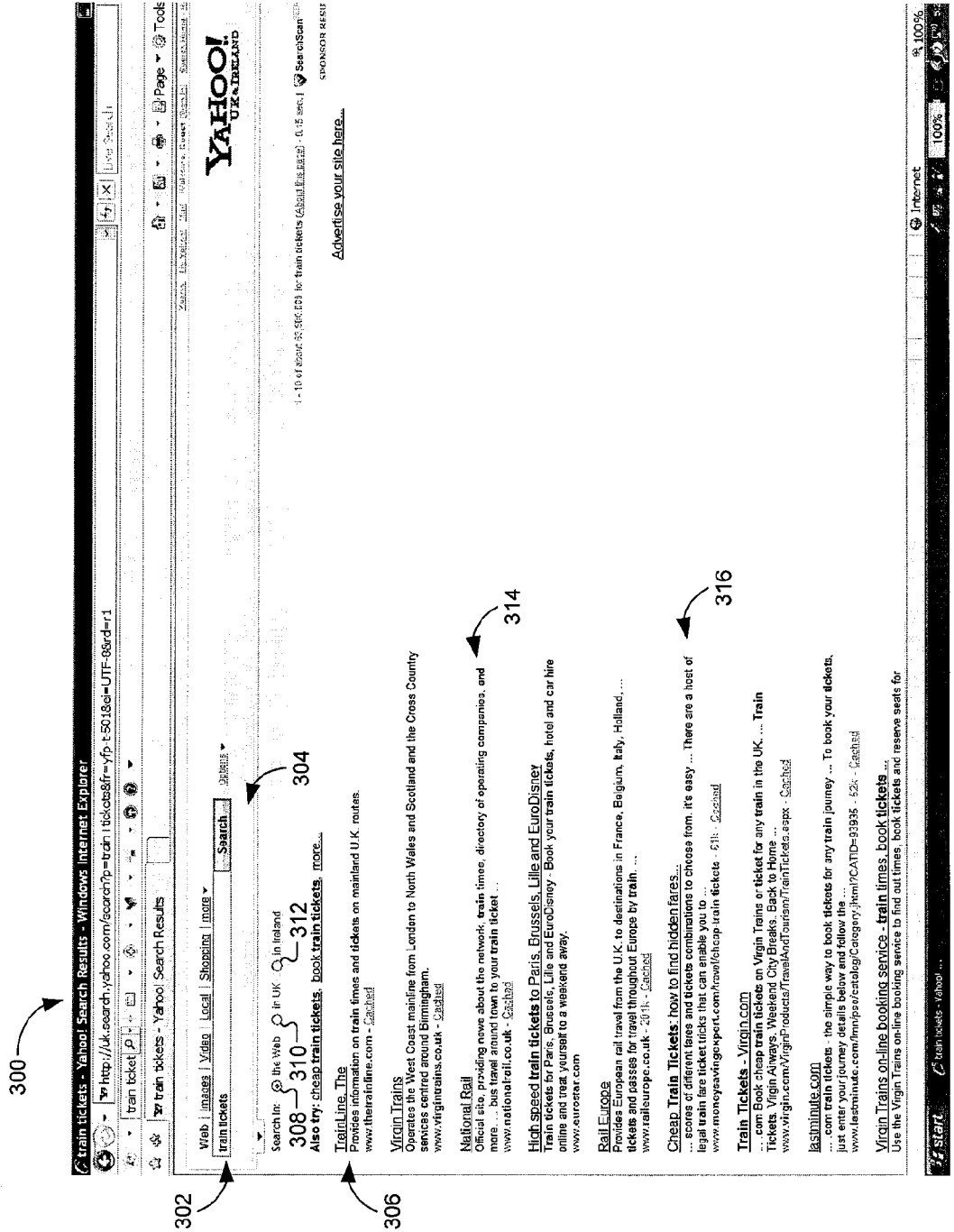
FIG. 3 is an exemplary illustration of a web display page generating by a query engine.

Referring now to FIG. 3, an exemplary display 300 generated by the search engine 12 is illustrated. The display 300 may be a web page provided by the search engine 12 to the user. In order to submit (i.e., initiate) searches, the display 300 includes a search query input 302 containing the submitted search query "train tickets" and a search button 304, enabling the user to modify the submitted search query "train tickets" and initiate, or submit, a new search query. The display 300 also includes a list of search results 306 generated by the search query "train tickets". Two of the search results (e.g., result 314 and result 316) from the list of search results 306 are marked with their respective region IDs. The result 314 represents a regional result (e.g., UK region) and the result 316 represents a global result.

The display 300 further includes radio buttons 308, 310, and 312. In the present example, the radio button 308 does not restrict or limit the search environment. The radio button 308 simply enables a search of "the Web" (i.e., perform a global search). The radio buttons 310 and 312 enable a user to refine, or filter, the list of search results to more specifically reflect the user's interest. The radio buttons 310 and 312 serve as regional sensitive filters by geographically filtering the search environment for only "in UK" and "in Ireland" results, respectively. For example, if a user resubmits the search query "train tickets" with one of the radio buttons 310 or 312 selected, a new list of search results will be filtered to include only "in UK" results (i.e., results relevant to the United Kingdom) or "in Ireland" results (i.e., results relevant to Ireland). In other words, the selection of either radio buttons 310 or 312 provides a strong indication that the user prefers to obtain regional sensitive query results such as result 314 which is a UK-based result. It should be noted that, in various embodiments, searching "the Web" with no geographic limitation or filtering is the default search environment of a search engine unless otherwise specified by a user.

Referring back to FIG. 2, the SWR computation module 32 analyzes user search behavior with regards to each given search query. Specifically, the SWR module 32 computes a metric of the local switch rate (SWR) feature for each search query based on user search preferences. As noted above, user search preferences may include whether a user prefers generic search results (i.e. initiating global searches) or local search results (i.e., initiating regional sensitive searches) based on, for example, the user's selection of radio button 308 or either of radio buttons 310 and 312, respectively. In one embodiment, the SWR metric is defined by the number of times a user modified an original search query by initiating a regional search (i.e., selecting a regional radio button) with the original search query divided by the number of times the user performed a generic search (i.e., selected "the Web") with the original search query. In various embodiments, the modified search query is submitted next-in-time after the original search query. In other words, the SWR metric indicates how frequently a user chooses to switch from receiving global search results to receiving local search results with regard to a specific search query. As such, the SWR metric indicates the likelihood of a user possessing local intent in connection with a specific search query.

Like the LL metric value discussed above, a computed SWR metric value that is above an SWR threshold value indicates that the associated search query likely represents a regional sensitive query. In various embodiments, the SWR threshold value may be set at variable values based in part of the amount of historical log data (e.g., the data stored within the query/click log module 14 related to the submitted search query) available to be mined by the SWR computation module 32. Those skilled in the art will appreciate that the higher the SWR metric value for a particular search query, the stronger the inference that the search query represents a regional sensitive query.

The RCR computation module 34 analyzes user selection behavior among various search results (e.g., URLs) returned in response to each given search query submission. The RCR module 34 computes a metric of the regional click rate (RCR) feature for each search query based on user clicks among the returned results for a submitted search query. In one embodiment, the RCR metric is defined by the number of times a user clicked (i.e., selects) a URL having regional content (regional result) divided by the number of times the user clicked a URL having no regional content (global results) for a given search query. Other definitions of the RCR metric may be used as well.

As discussed above, each URL generated by a given search query may be tagged with a regional ID indicative of whether the respective result includes regional content. In some embodiments, the regional IDs may designate various levels of regional content characterizing each URL for further analysis by the search engine 12. A URL may be tagged as being a regional result based on factors including, but not limited to, the host location the URL, whether the URL includes a regional domain name, and the number of various other regional web pages linking to the URL. For example, referring to FIG. 3, result 314 represents a UK-regional result that includes a URL having a regional domain name of www.nationalrail.co.uk.

A computed RCR metric value that is above an RCR threshold value indicates that the submitted search query likely represents a regional sensitive query. In various embodiments, the RCR threshold value may be set at variable values based in part of the amount of historical log data (e.g., the data stored within the query/click log module 14 related to the submitted search query) available to be mined by the RCR computation module 34. Those skilled in the art will appreciate that the higher the RCR metric value for a particular search query, the stronger the inference that the search query represents a regional sensitive query.

The metaclass computation module 36 communicates with the LL computation module 30, SWR computation module 32, and the RCR computation module 34. The metaclass computation module 34 analyzes co-occurrence statistics, user search behavior, and/or user selection behavior with regards to a given search query.

In one embodiment, the metaclass computation module 34 retrieves the LL metric value, the SWR metric value, and the RCR metric value for a given search query from the LL computation module 30, SWR computation module 32, and the RCR computation module 34, respectively. The metaclass computation module 36 computes a metaclass metric based on various combinations of the LL feature, the SWR feature, and/or the RCR feature, referred to collectively as the features. In other words, the metaclass computation module 36 computes the metaclass metric of a given search query based on the LL metric, the SWR metric, and/or the RCR metric of the given search query.

In one embodiment, the metaclass computation module 36 computes the metaclass metric of a given search query as follows:

$$Metaclass = \frac{1}{n}\sum_i \frac{1}{t_i} * f_i,$$

where the variable i represents a feature, the variable $f_i$ represents the metric value for the feature i, to the variable n represents the number of features, and the variable $t_i$ represents the threshold value for the feature i.

A computed metaclass metric value that is above a metaclass threshold value indicates that the submitted search query likely represents a regional sensitive query. In various embodiments, the metaclass threshold value may be set at variable values based in part of the amount of historical log data (e.g., the data stored within the query/click log module 14 related to the submitted search query) available to be mined by the metaclass computation module 36. Those skilled in the art will appreciate that the higher the metaclass metric value for a particular search query, the stronger the inference that the search query represents a regional sensitive query.

In another embodiment, the metaclass computation module 36 sets the metaclass metric to the maximum value among the computed metrics of the features for a given search query. For example, for a given search query having a LL metric value of 0.6, a SWR metric value of 0.4, and a RCR metric value of 0.7, the metaclass metric equals 0.7. Therefore, in this example, the metaclass threshold effectively equals the RCR threshold.

In yet another embodiment, the metaclass computation module 36 determines whether a majority of the features indicate that the given search query represents a region specific query or a global query. Specifically, the metaclass computation module 36 compares each of the features to their respective threshold values to determine whether they indicate that the given search query represents a regional specific query or a global query. As such, in this embodiment, the metaclass computation module 36 generates an analogous indication (i.e., the majority indication) as that of its constituent majority features with regards to whether the given search query represents a region specific query or a global query. In yet another embodiment, the metaclass computational module 36 computes a linear combination of each of the features.

Various evaluation metrics such as, but not limited to, precision, recall, f-measure, and/or accuracy may be utilized to critique each of the features. In various embodiments, the classification threshold of each of the features may be varied based on one or more of the evaluation metrics. For example, the classification threshold for each respective feature may be varied such that the precision metric of the respective features reaches a predetermined value (e.g., 0.90 or 90%) and the recall metric of the respective features reaches a maximum value.

The search engine 12 may perform ranking functions of results returned from the submission of a given search query based in part on the features, independently or in combination, as well as the meta-query classifier.

Figure 4:
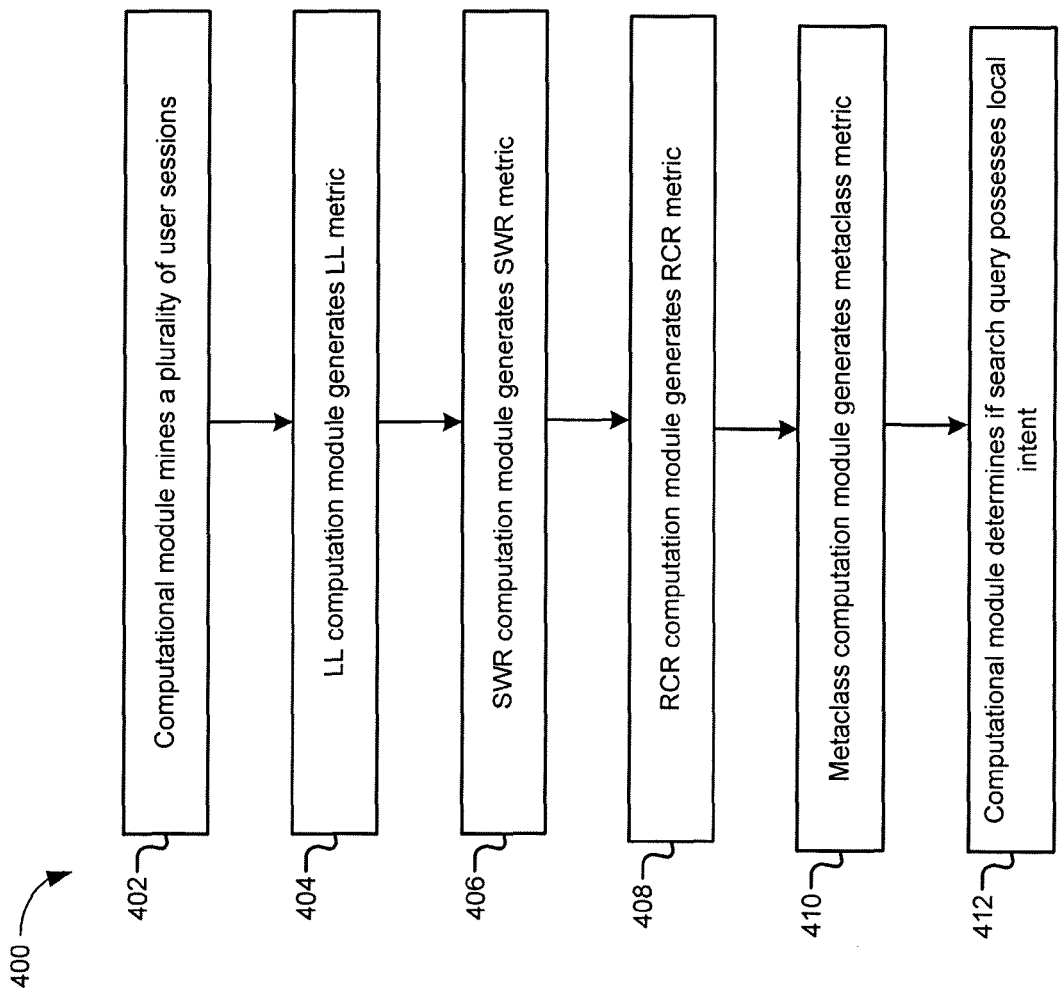
FIG. 4 is a flow diagram illustrating steps of operating an exemplary query classification method according to one embodiment of the present disclosure.

Referring to FIG. 4, an exemplary method 400 of performing a query classification operation for a given search query is shown in more detail. In block 402, the computational module 16 mines a plurality of user sessions comprising query records from query logs and click logs stored in the query/click log module 14. In block 404 the LL computation module 30 generates a LL metric for a given search query based on the plurality of user sessions. In block 406, the SWR computational module 32 generates a SWR metric for the given search query based on the plurality of user sessions. In block 408, the RCR computational module 408 generates a RCR metric for the given search query based on the plurality of user sessions. In block 410, the metaclass computational module 36 generates a metaclass metric based on the LL metric, SWR metric, and the RCR metric of the given search query. In block 412, the computational module 16 determines whether the given search query possesses local intent based on the metaclass metric.

Figure 5:
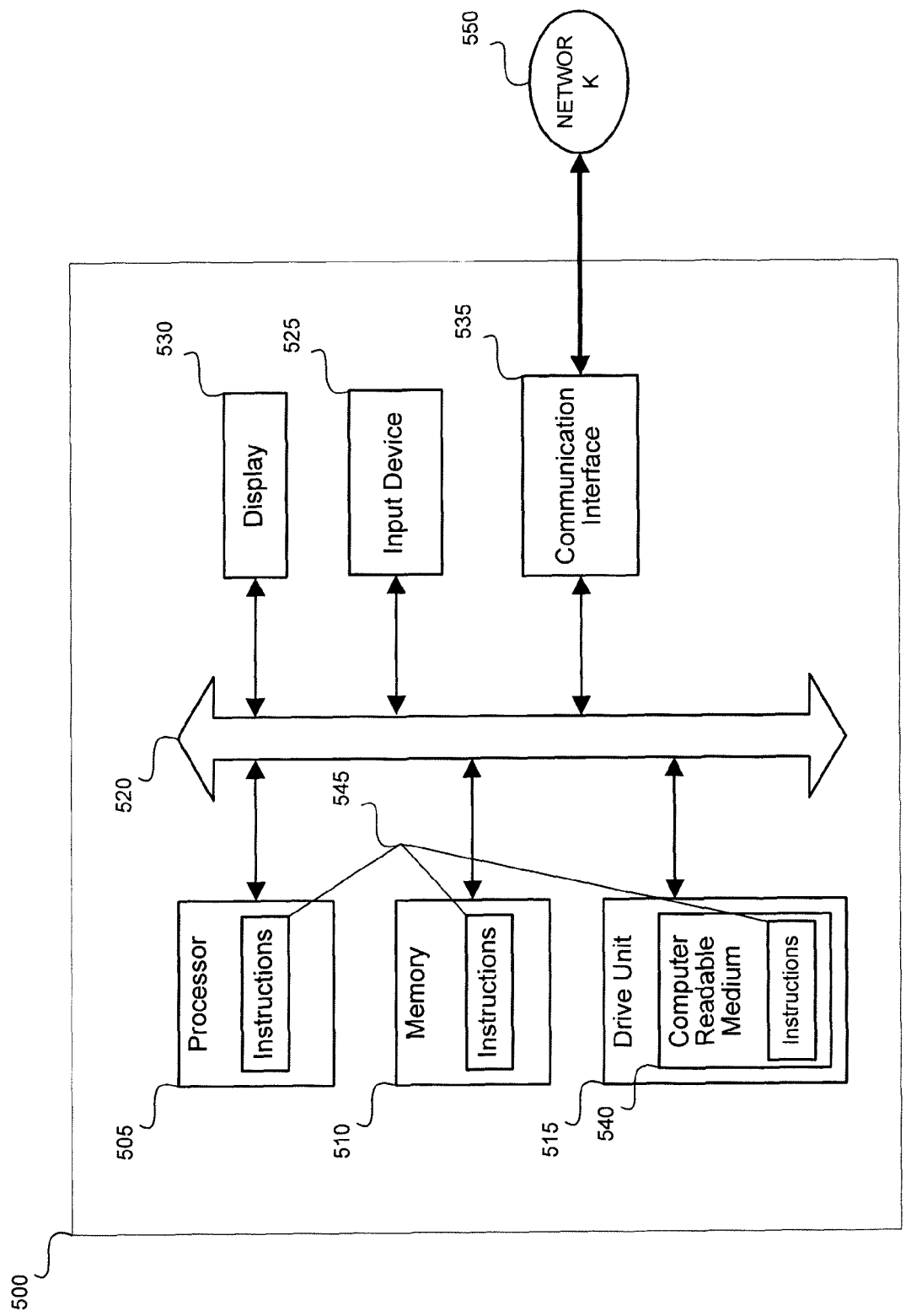
FIG. 5 illustrates a general computer system, which may represent any of the computing devices referenced within the present disclosure.

Referring to FIG. 5, an illustrative embodiment of a general computer system, is shown and is designated 500. Any of the components shown in the computing system 500 may describe the components discussed with respect to FIGS. 1 and 2. The computer system 500 may include a set of instructions 545 that may be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 545 (sequential or otherwise) that specify actions to be taken by that machine.

In one embodiment, the computer system 500 may be implemented using electronic devices that provide voice, video or data communication. Further, while a single computer system 500 may be illustrated, the term "system" shall also be taken to include any collection of systems or subsystems that individually or jointly execute a set, or multiple sets, of instructions to perform one or more computer functions.

As illustrated in FIG. 5, the computer system 500 may include a processor 505, such as, a central processing unit (CPU), a graphics processing unit (GPU), or both. The processor 505 may be a component in a variety of systems. For example, the processor 505 may be part of a standard personal computer or a workstation. The processor 505 may be one or more general processors, digital signal processors, application specific integrated circuits, field programmable gate arrays, servers, networks, digital circuits, analog circuits, combinations thereof, or other now known or later developed devices for analyzing and processing data. The processor 505 may implement a software program, such as code generated manually (i.e., programmed).

The computer system 500 may include a memory 510 that can communicate via a bus 520. For example, the registration database 110 may be stored in the memory. The memory 510 may be a main memory, a static memory, or a dynamic memory. The memory 510 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 510 may include a cache or random access memory for the processor 505. Alternatively or in addition, the memory 510 may be separate from the processor 505, such as a cache memory of a processor, the system memory, or other memory. The memory 510 may be an external storage device or database for storing data.

Examples may include a hard drive, compact disc ("CD"), digital video disc ("DVD"), memory card, memory stick, floppy disc, universal serial bus ("USB") memory device, or any other device operative to store data. The memory 510 may be operable to store instructions 545 executable by the processor 505. The functions, acts or tasks illustrated in the figures or described herein may be performed by the programmed processor 505 executing the instructions 545 stored in the memory 510. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 500 may further include a display 530, such as a liquid crystal display (LCD), an organic light emitting diode (OLED), a flat panel display, a solid state display, a cathode ray tube (CRT), a projector, a printer or other now known or later developed display device for outputting determined information. The display 530 may act as an interface for the user to see the functioning of the processor 505, or specifically as an interface with the software stored in the memory 510 or in the drive unit 515. In this regard, the display 530 may be utilized to display, for example, whether a business organization is a candidate for transformation. The display 530 may also be utilized to display a transformation plan. In addition, the various reports and surveys described above may be presented on the display 530.

Additionally, the computer system 500 may include an input device 530 configured to allow a user to interact with any of the components of system 500. The input device 525 may be a number pad, a keyboard, or a cursor control device, such as a mouse, or a joystick, touch screen display, remote control or any other device operative to interact with the system 500.

The computer system 500 may also include a disk or optical drive unit 515. The disk drive unit 515 may include a computer-readable medium 540 in which one or more sets of instructions 545, e.g. software, can be embedded. Further, the instructions 545 may perform one or more of the methods or logic as described herein. The instructions 545 may reside completely, or at least partially, within the memory 510 and/or within the processor 505 during execution by the computer system 500. The memory 510 and the processor 505 also may include computer-readable media as discussed above.

The present disclosure contemplates a computer-readable medium 540 that includes instructions 545 or receives and executes instructions 545 responsive to a propagated signal; so that a device connected to a network 550 may communicate voice, video, audio, images or any other data over the network 550. The instructions 545 may be implemented with hardware, software and/or firmware, or any combination thereof. Further, the instructions 545 may be transmitted or received over the network 550 via a communication interface 535. The communication interface 535 may be a part of the processor 505 or may be a separate component. The communication interface 535 may be created in software or may be a physical connection in hardware. The communication interface 535 may be configured to connect with a network 550, external media, the display 530, or any other components in system 500, or combinations thereof. The connection with the network 550 may be a physical connection, such as a wired Ethernet connection or may be established wirelessly as discussed below. Likewise, the additional connections with other components of the system 500 may be physical connections or may be established wirelessly.

The network 550 may include wired networks, wireless networks, or combinations thereof. Information related to business organizations may be provided via the network 550. The wireless network may be a cellular telephone network, an 802.11, 802.15, 802.20, or WiMax network. Further, the network 550 may be a public network, such as the Internet, a private network, such as an intranet, or combinations thereof, and may utilize a variety of networking protocols now available or later developed including, but not limited to TCP/IP based networking protocols.

The computer-readable medium 540 may be a single medium, or the computer-readable medium 540 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 540 may include a solid-state memory such as a memory card or other package that houses one or more non-volatile read-only memories. The computer-readable medium 540 also may be a random access memory or other volatile re-writable memory. Additionally, the computer-readable medium 540 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The method and system may also be embedded in a computer program product, which included all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

What is claimed is:

1. A system for determining the intent of query, comprising:
   a computer system operating with a set of instructions to cause the computer system to form:
      a search engine that receives a first search query;
      a query/click log module configured to store log data associated with the first search query; and
      a computational module that generates metric values associated with the first search query based on the log data and that determines that the first search query is one of a regional specific query or a global query based on the metric values, wherein the metric values reflect a likelihood of local intent of the first search query, the computational module including
         a location likelihood (LL) computational module that identifies at least one n-gram within the first search query and that generates a first metric value based on the number of times the at least one n-gram occurs with a location term within a geographic region relative to the number of times the at least one n-gram occurs within the geographic region, and
         a local switch rate (SWR) computation module that generates a second metric based on the number of times a second search query was submitted in tandem with a regional search option relative to the number of times the first search query was submitted without the regional search option, wherein the first search query and the second search query include the same content, and
      wherein the search engine provides search results selected in part based on the metric values.

2. The system of claim 1 wherein the log data includes query log data and click log data for analysis by the computational module, wherein the query log data and click log data are associated with the first search query.

3. The system of claim 1 wherein the LL computational module determines that the first search query is regional specific query when the first metric value exceeds a LL threshold.

4. The system of claim 1 wherein the SWR computation module determines that the first search query is regional specific query when the second metric value exceeds a SWR threshold.

5. The system of claim 1 wherein the computational module further comprises a regional click rate (RCR) computation module that generates a third metric value based on selections among a plurality of results generated by initiating the first search query.

6. The system of claim 5 wherein the third metric value is generated based on the number of times a regional result was selected relative to the number of times a global result was selected from the plurality of results.

7. The system of claim 6 wherein the RCR computation module determines that the first search query is regional specific query when the third metric value exceeds a RCR threshold.

8. The system of claim 5 wherein the computational module further comprises a meta-query classifier (metaclass) computation module that generates a fourth metric value based on a combination of the first value, the second metric value, and the third metric value and determines that the first search query is a regional specific query when the fourth metric value exceeds a metaclass threshold.

9. The system of claim 1 further comprising a proxy module that stores the metric values associated with the first search query.

10. The system of claim 9 wherein the search engine accesses the proxy module during the execution of a second search query and retrieves the metrics associated with the first search query, wherein the first search query and the second search query include the same content.

11. A method for determining the intent of query, comprising:
   receiving at a computer system a first search query;
   storing in a data storage system log data associated with the first search query;
   at the computer system, generating metric values associated with the first search query based on the log data and determining that the first search query is one of a regional specific query or a global query based on the metric values, including
      identifying at least one n-gram within the first search query and generating a first metric value based on the number of times the at least one n-gram occurs with a location term within a geographic region relative to the number of times the at least one n-gram occurs within the geographic region, and
      generating a second metric based on the number of times a second search query was submitted in tandem with a regional search option relative to the number of times the first search query was submitted without the regional search option, wherein the first search query and the second search query include the same content; and
   at the computer system, providing search results selected in part based on the metric values,
   wherein the metric values reflect a likelihood of local intent of the first search query.

12. The method of claim 11 wherein the log data includes query log data and click log data associated with the first search query.

13. The method of claim 11 further comprising determining that the first search query is regional specific query when the first metric value exceeds a LL threshold.

14. The method of claim 11 further comprising determining that the first search query is regional specific query when the second metric value exceeds a SWR threshold.

15. The method of claim 11 further comprising generating a third metric value based on selections among a plurality of results generated by initiating the first search query.

16. The method of claim 15 wherein the third metric value is generated based on the number of times a regional result was selected relative to the number of times a global result was selected from the plurality of results.

17. The method of claim 16 further comprising determining that the first search query is regional specific query when the third metric value exceeds a RCR threshold.

18. The method of claim 15 further comprising generating a fourth metric value based on a combination of the first value, the second metric value, and the third metric value and determining that the first search query is regional specific query when the fourth metric value exceeds a metaclass threshold.

19. The method of claim 11 further comprising storing the metric values associated with the first search query.

20. The method of claim 19 further comprising retrieving the metric values associated with the first search query during the execution of a second search query, wherein the first search query and the second search query include the same content.

* * * * *